E. C. SEWARD, Jr.
VEHICLE TIRE.
APPLICATION FILED JUNE 5, 1913.

1,165,630.

Patented Dec. 28, 1915.

Witnesses:
Harry S. Fleischer
F. George Barry

Inventor:
Edward C. Seward Jr.
by his attorneys
Brown & Seward

UNITED STATES PATENT OFFICE.

EDWARD C. SEWARD, JR., OF NEW YORK, N. Y., ASSIGNOR TO EUREKA TIRE COMPANY, OF TRENTON, NEW JERSEY, A CORPORATION OF NEW JERSEY.

VEHICLE-TIRE.

1,165,630.     Specification of Letters Patent.     Patented Dec. 28, 1915.

Application filed June 5, 1913. Serial No. 771,907.

*To all whom it may concern:*

Be it known that I, EDWARD C. SEWARD, Jr., a citizen of the United States, and resident of the borough of Brooklyn, in the city and State of New York, have invented a new and useful Improvement in Vehicle-Tires, of which the following is a specification.

This invention relates to vehicle tires and more particularly to the open bellied casings for pneumatic tires.

The object is to provide a structure of this character which will have very great strength and puncture proof qualities, while retaining resiliency to a high degree.

Another object is to provide a structure of this kind in which the effective thickness of the fabric carcass is greatly increased without increasing either the stiffness of the tire as a cushion or the internal friction of the tire when in use.

The so-called casings of pneumatic tires are very well known in the art to-day and are practically always constructed with an opening along the inner periphery thereof, and hence are classed as so-called open bellied tires. This kind of a casing is generally constructed by stretching strips of bias fabric, impregnated with vulcanizable rubber about a metallic annulus, known as a core or mandrel, and forming the edges of the strips of fabric down around the side walls of the core. Sufficient layers of fabric are used to give the tire considerable strength, puncture proof and wear-resisting qualities, but it has been found impractical to incorporate a sufficient number of these plies or layers of fabric in such a casing to make it practically puncture proof and give it extraordinary wearing properties, owing to the fact that such increase in the fabric renders the tire extremely stiff in its side walls, thus materially reducing its resiliency; and again the increase in the number of layers of fabric correspondingly increases the amount of internal friction, thus causing a serious loss of the motive power for propelling the vehicle in connection with which the tire is used, and furthermore, it adds greatly to the expense owing to the consumption of a large amount of expensive fabric.

In the tire structure contemplated by this present invention, all the beneficial effects of greatly increasing the number of the plies or layers of fabric are obtained, without any of the detrimental effects being entrained, and furthermore, the additional amount of fabric used is relatively small.

Figure 1:
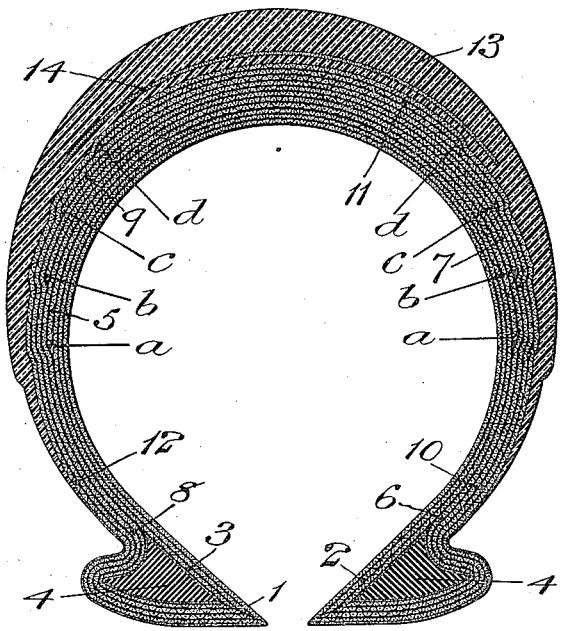
Figure 2:
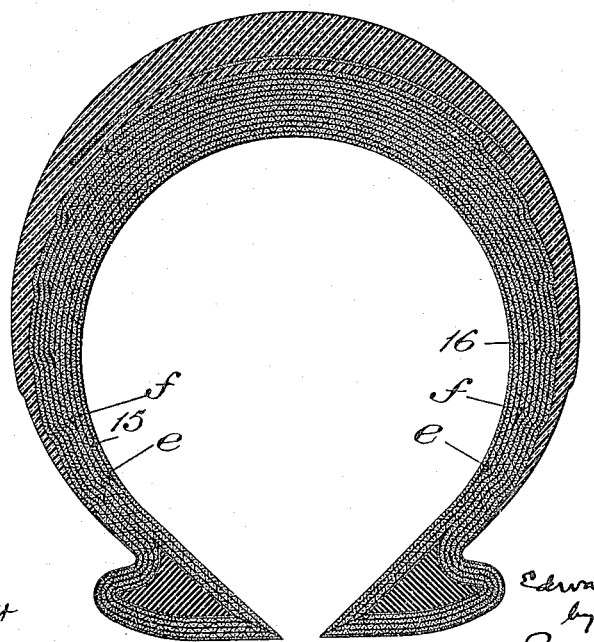

Practical embodiments of the invention are represented in the accompanying drawings, in which, Figure 1 represents a cross section of a clencher casing made in accordance with the preferred form of my invention, and Fig. 2 represents a similar view of a modified form.

Referring now to the preferred form shown in Fig. 1, it will be seen that the inner plies or layers of fabric, denoted by 1, 2, 3, respectively, are incorporated in the tire structure in the usual manner extending transversely from margin to margin thereof. After these three layers have been placed in position and properly formed, the bead cores, denoted by 4, are located in their appropriate place in the structure for initiating the cross sectional shape which the margins or edges of the tire are intended to have in order to promote their interlocking engagement with the in-turned edges of the so-called clencher wheel rim. After the layers 1, 2 and 3, and the bead cores 4 have been placed in position, there is inserted another layer of fabric 5, which rests upon the layer 3, but which, instead of extending from margin to margin of the tire, only extends from substantially the middle of the tire on one side thereof to a corresponding position on the opposite side, the points of termination of these edges being denoted by *a a;* this ply or layer therefore being substantially exclusively incorporated in the outer half or tread portion of the casing. After the layer 5 has thus been incorporated in the tire structure, another layer 6 is placed in position extending entirely over the layers 5 and 3, and around the bead cores 4, down to the extreme margins of the tire where it abuts the edges of the layer 3.

After the layer 6 is in proper position, there is inserted a layer 7, which is applied upon the layer 6, in the same manner that the layer 5 is applied upon the layer 3, except that the layer 7 is narrower than the layer 5, and hence its edges do not extend as far down in the side walls as the edges of the layer 5, but terminate at the points denoted by *b b*. After the layer 7 has thus been placed in position, another layer 8 is placed outside thereof and extending transversely throughout the tire body around all the previously formed layers or plies of fabric and around the bead cores 4, down to the extreme margins of the tires where it abuts the edges of the layer 2.

When the layer 8 has been properly located, another layer 9 is placed on the outside of the layer 8, in the same manner that the layers 7 and 5 were positioned, except that the layer 9 is narrower than the layer 7, and hence its edges do not extend as far down in the side walls of the tire, but terminate at the points denoted by c c.

The narrow layer 9 having been placed in position, another layer 10 is built in to the tire which extends transversely throughout, covering all the previously formed layers and the bead cores 4, and terminating in the extreme margins of the tire where it abuts the edges of the layers 1 and 2. This layer 10 having been incorporated in the tire structure, another narrow layer 11 is placed on the outside thereof in the same manner as in the case of the layers 9, 7 and 5, but this layer 11 is narrowest of all and hence its edges do not extend as far down in the side walls of the tire as the layer 9, but terminate at the points denoted by d d. The last narrow layer 11 being now formed in the tire structure, a final layer 12 is placed on the outside thereof, covering all the previously formed layers and the bead cores, and extending to the extreme margins of the tire where it abuts the edges of the layer 1. The tire carcass proper has now been completed and the tire as a whole may be finished by placing thereon a tread 13 composed of a suitable rubber compound in which may be incorporated the customary breaker strip 14.

It will be understood that the above description applies to a tire which has seven of the full width plies or layers of fabric, and that the number of the narrow layers or plies might be increased or diminished as the number of the main or full width layers or plies, customarily combined into this kind of tire, is either increased or diminished, according to the strength and size of tire desired. All the layers of fabric are of course, composed of a suitable material properly impregnated or coated with rubber in accordance with the ordinary procedure, and after the tire as a whole has been completed, it may be vulcanized in any suitable manner, though I prefer what is known in the art as the one cure wrapped tread method.

Referring now to the form shown in Fig. 2, it will be seen that in its essence it is the same as that shown in Fig. 1, except that the narrow strips of fabric are incorporated after the first inner layer of fabric has been applied, instead of after the third; thereby providing two more of the narrow strips in a tire having seven of the main full width plies or layers than in the case of the form shown in Fig. 1, and the two inner narrow strips 15 and 16 respectively being wider than the strip 5, shown in the form represented in Fig. 1, and hence extending farther down in the side walls of the tire and terminating at the points denoted by e e and f f respectively. In other regards this form is exactly the same as that represented in Fig. 1.

It will be seen that by the above arrangement, I obtain a firmly united fabric carcass structure for the tire casing which has many more layers of fabric at its outer tread portion than it has in its side walls, and hence is greatly reinforced against puncture and wear at its point of contact with the road surface, while the side walls remain of standard thickness, and therefore resiliency, for a so-called "seven-ply" carcass; and furthermore, it is not necessary to make the bead cores 4 smaller than standard in order to accommodate an extra number of plies of fabric in the so-called standard clencher rim which is adapted for receiving a tire of any given dimension.

I desire it to be understood that I do not limit my invention with respect to the particular character of materials, or the particular number of plies or particular width of the plies, or any other respects, except as specifically recited in the claims, for it is obvious that changes may be made in the construction and arrangement of the several components without departing from the spirit and scope of my invention.

What I claim is:

1. An open-bellied tire comprising peripherally disposed sheets of woven fabric, each sheet extending completely around the circumference of the tire, alternate sheets having a transverse extent from margin to margin of the tire, and intermediate sheets having a less transverse extent, the said intermediate sheets being of different widths and progressively narrower as they approach the outer portion of the tire.

2. An open-bellied tire comprising peripherally disposed sheets of woven fabric, each sheet extending completely around the circumference of the tire, alternate sheets having a transverse extent from margin to margin of the tire, and intermediate sheets having a less transverse extent, the said intermediate sheets being of different widths and progressively narrower as they approach the outer portion of the tire, the widest of said intermediate sheets having a transverse extent throughout substantially the outer half of the tire.

3. An open-bellied tire comprising peripherally disposed sheets of woven fabric, each sheet extending completely around the circumference of the tire, alternate sheets having a transverse extent from margin to margin of the tire, and intermediate sheets having a less transverse extent, the said intermediate sheets being of different widths and progressively narrower as they approach the outer portion of the tire, the circumferential central portions of all the said sheets lying in the same radial plane with respect to the cross section of the tire.

In testimony, that I claim the foregoing as my invention, I have signed my name in presence of two witnesses, this fourth day of June 1913.

EDWARD C. SEWARD, Jr.

Witnesses:
F. George Barry,
C. S. Sundgren.

Copies of this patent may be obtained for five cents each, by addressing the "Commissioner of Patents, Washington, D. C."